(12) United States Patent
Resutek et al.

(10) Patent No.: US 10,408,512 B2
(45) Date of Patent: Sep. 10, 2019

(54) VALVE-IN-RECEIVER INCLUDING A FLUID FLOW DIRECTING DESICCANT FOR A VEHICLE CLIMATE CONTROL SYSTEM

(71) Applicant: GM GLOBAL TECHNOLOGY OPERATIONS LLC, Detroit, MI (US)

(72) Inventors: James Resutek, Romeo, MI (US); Jeffrey A Bozeman, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 260 days.

(21) Appl. No.: 15/598,387

(22) Filed: May 18, 2017

(65) Prior Publication Data
US 2018/0335235 A1 Nov. 22, 2018

(51) Int. Cl.
| F25B 43/00 | (2006.01) |
| B60H 1/00 | (2006.01) |
| B60H 1/32 | (2006.01) |
| F25B 13/00 | (2006.01) |
| F25B 40/00 | (2006.01) |

(52) U.S. Cl.
CPC ....... *F25B 43/003* (2013.01); *B60H 1/00507* (2013.01); *B60H 1/3204* (2013.01); *B60H 1/3229* (2013.01); *F25B 13/00* (2013.01); *F25B 40/00* (2013.01); *F25B 2400/053* (2013.01); *F25B 2400/054* (2013.01); *F25B 2400/162* (2013.01); *F25B 2500/18* (2013.01)

(58) Field of Classification Search
CPC .............. F25B 43/003; F25B 2400/053; F25B 2400/054
See application file for complete search history.

(56) References Cited

U.S. PATENT DOCUMENTS

| 4,318,809 A * | 3/1982 | Bethel | B01D 15/00 |
| | | | 137/512.15 |
| 6,381,983 B1 * | 5/2002 | Angelo | B01D 53/261 |
| | | | 210/435 |
| 6,615,610 B1 * | 9/2003 | Pettitt | B60H 1/00571 |
| | | | 62/474 |

* cited by examiner

*Primary Examiner* — Ana M Vazquez

(57) ABSTRACT

A valve in receiver (VIR) for a climate control system includes a receiver drier shell having an outer surface and an inner surface defining an interior portion having an opening. A drier housing is disposed in the receiver drier shell and a molded desiccant is disposed internal to the drier housing. The molded desiccant is configured to form a restrictive fluid flow passage along an interior surface of the drier housing.

9 Claims, 4 Drawing Sheets

VALVE-IN-RECEIVER INCLUDING A FLUID FLOW DIRECTING DESICCANT FOR A VEHICLE CLIMATE CONTROL SYSTEM

FIELD OF THE INVENTION

The subject invention relates to the art of vehicles and, more particularly, to a valve-in-receiver (VIR) including a fluid flow directing desiccant for a vehicle climate control system.

BACKGROUND

Most modern vehicles include a climate control system having a heating option and a cooling option. The cooling option is typically embodied by an air conditioning system in which heat is exchanged with a refrigerant passing through an evaporator located in a cabin area. A flow of air is directed over the evaporator into the occupant area.

In order to optimize the operation of your vehicle's air-conditioning system, the A/C system needs to have a reliable refrigerant moisture desiccant. Desiccants are substances that remove and retain moisture from the refrigerant before it cycles back into you're A/C system, allowing it to exchange heat more efficiently. Accordingly, it is desirable to provide a climate control system with a efficient desiccant for removing moisture from refrigerant.

SUMMARY OF THE INVENTION

In accordance with an exemplary embodiment, a valve-in-receiver (VIR) including a fluid flow directing desiccant for a vehicle climate control system includes a receiver drier shell including an outer surface and an inner surface defining an interior portion having an opening, a drier housing disposed in the receiver drier shell, and a molded desiccant disposed internal to the drier housing and configured to form a restrictive fluid flow passage along an interior surface of the drier housing.

In accordance with an aspect of an exemplary embodiment, a climate control system for a vehicle includes at least one other molded desiccant disposed external to the drier housing and configured to form at least one other restrictive fluid flow passage along an exterior surface of the drier housing. Another aspect of the exemplary embodiment includes a first conduit extending into the drier housing between the interior surface and the molded desiccant. And another aspect wherein the molded desiccant further includes an exterior surface complementary to the interior surface of the drier housing. And yet another aspect wherein the at least one other molded desiccant further includes an interior surface complementary to the exterior surface of the drier housing. Still another aspect includes disposing a molded desiccant on the interior surface of the receiver drier shell.

In accordance with another aspect of an exemplary embodiment, a vehicle includes a chassis, a body supported by the chassis. The body includes a motor compartment and an occupant zone. A climate control system is supported by the body. The climate control system includes a condenser arranged in the motor compartment, the condenser including a condenser outlet portion, and a compressor arranged in the motor compartment. The compressor includes a compressor inlet portion and a compressor outlet portion. The compressor outlet portion is fluidically connected to the condenser. An evaporator is arranged in the occupant zone. The evaporator includes an evaporator inlet portion and an evaporator outlet portion. A valve-in-receiver (VIR) is fluidically coupled to the condenser, the compressor and the evaporator.

The VIR includes a receiver drier shell including an outer surface and an inner surface defining an interior portion having an opening. Other aspects of the VIR include a drier housing disposed in the receiver drier shell and a molded desiccant disposed internal to the drier housing and configured to form a restrictive fluid flow passage along an interior surface of the drier housing. The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
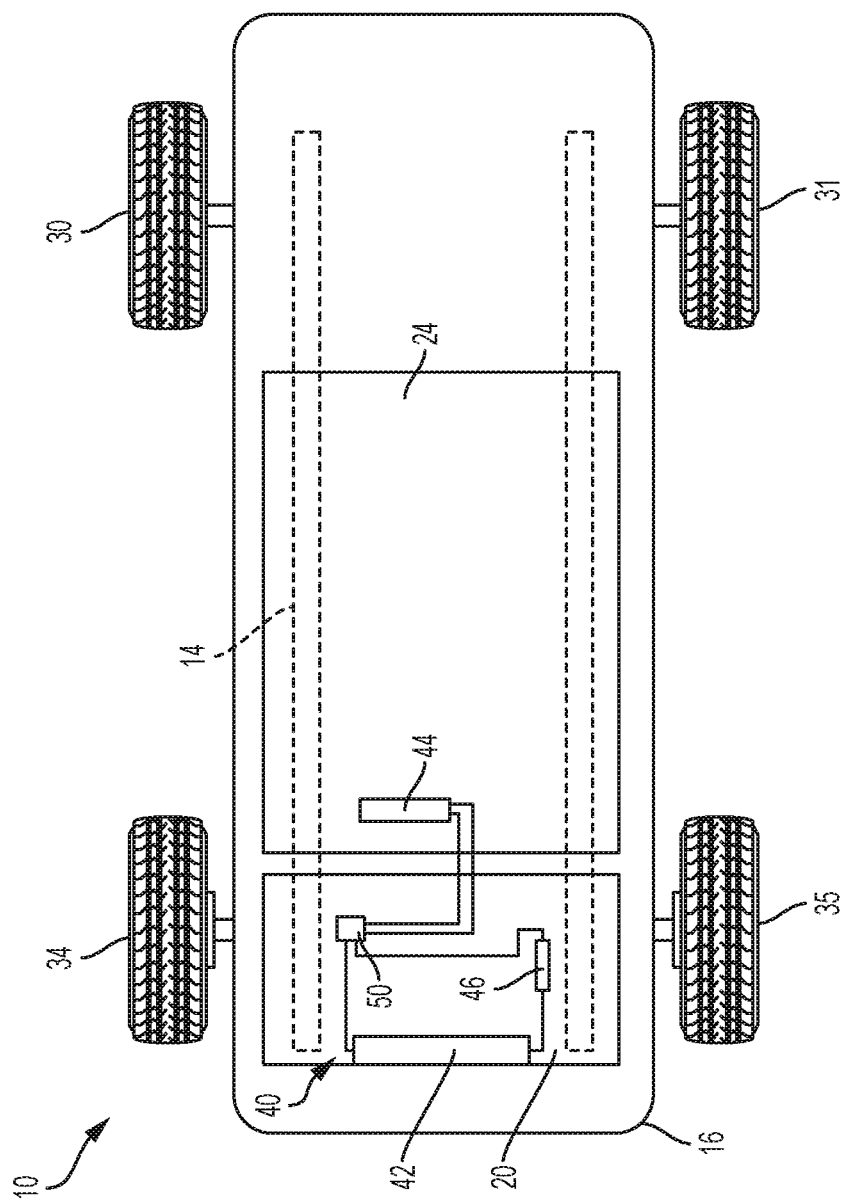
FIG. 1 is a schematic diagram of a vehicle having a climate control system provided with a valve-in-receiver (VIR), in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 14 that supports a body 16 having a motor compartment 20 housing a prime mover (not shown) and an occupant zone 24. It is to be understood that the prime mover may take on a variety of forms including internal combustion engines, electric motors, hybrid electric motors, clean fuel motors and the like. Vehicle 10 includes first and second rear wheels 30 and 31 as well as first and second front wheels 34 and 35. Rear wheels 30 and 31 may provide a motive force to vehicle 10. It is however to be understood that front wheels 34 and 35 may, alternatively provide the motive force or all four wheels 30, 31, 34, and 35 may provide the motive force.

Vehicle 10 includes a climate control system, a portion of which is shown at 40. Climate control system 40 includes a condenser 42 arranged at a forward portion (not separately labeled) of vehicle 10, an evaporator 44 which may be arranged in occupant zone 24, a compressor 46 and a valve-in-receiver (VIR) 50. VIR 50 receives and stores a portion of liquid refrigerant from condenser 42. In addition VIR 50 may separate gas and liquid portions of the refrigerant and as will be discussed below, VIR 50 substantially prevents debris and moisture from passing to compressor 46.

Figure 2:
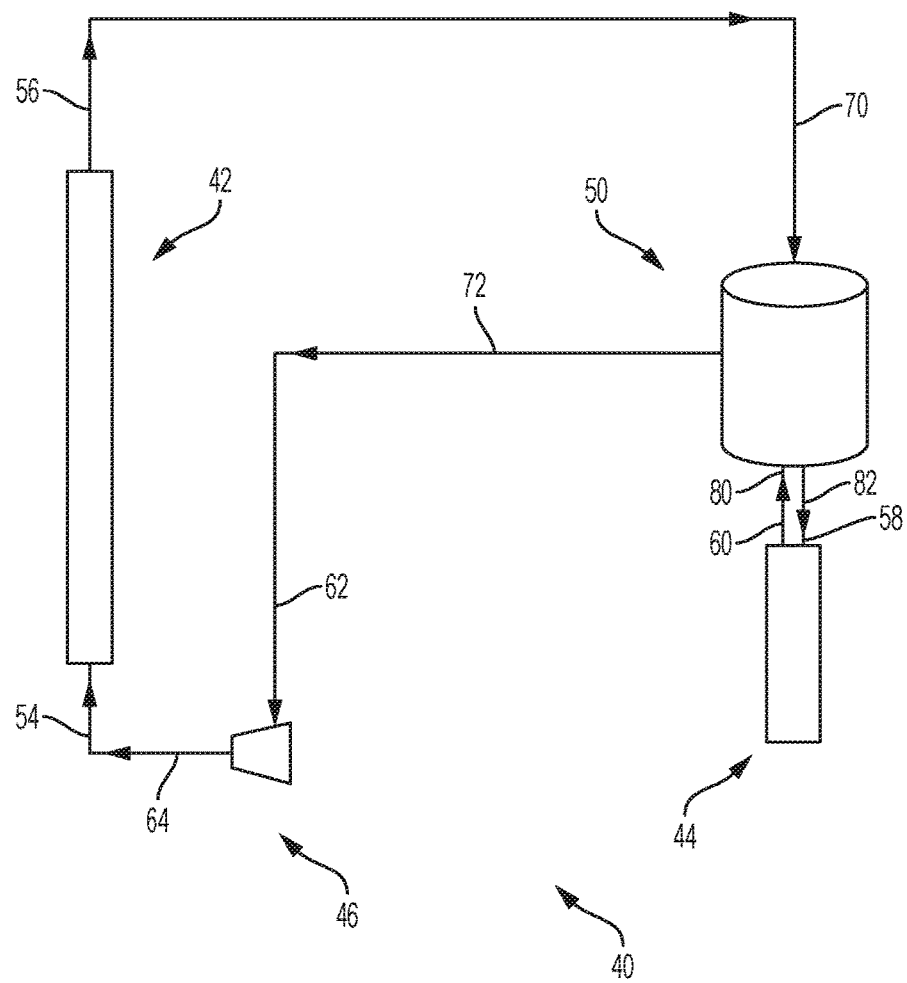
FIG. 2 is a schematic diagram depicting the climate control system of FIG. 1.

As shown in FIG. 2, condenser 42 includes a condenser inlet portion 54 and a condenser outlet portion 56. A flow of air passes over/through condenser 42 in a heat exchange relationship with the refrigerant. Evaporator 44 includes an evaporator feed conduit 58 and an evaporator discharge conduit 60. A fan (not shown) delivers a flow of air over/through evaporator 44 in a heat exchange relationship with the refrigerant. The air passes into the occupant zone at a reduced temperature to provide a desired cooling effect. Compressor 46 includes a compressor inlet portion 62 that is fluidically connected with VIR 50 and a compressor outlet portion 64 that is fluidically connected to condenser inlet portion 54.

Figure 3:
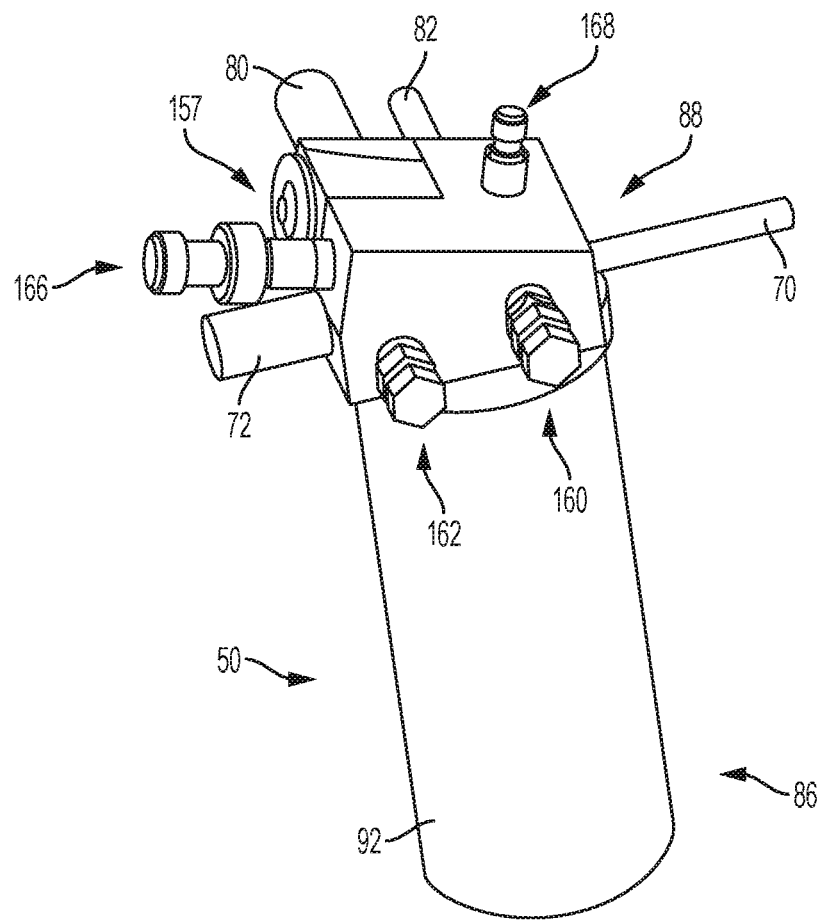
FIG. 3 is a perspective view of the VIR of FIG. 1, in accordance with an aspect of an exemplary embodiment.
Figure 4:
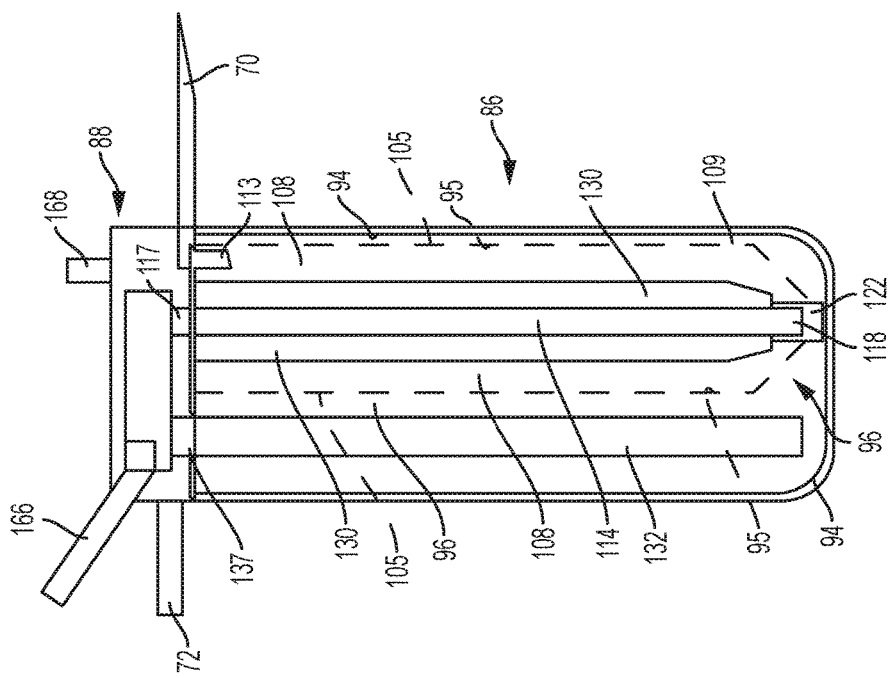
FIG. 4 is a partial cross-sectional view of the VIR of FIG. 3, in accordance with an aspect of an exemplary embodiment.

In accordance with an exemplary aspect, VIR 50 includes a condenser inlet 70 fluidically connected to condenser outlet portion 56, a compressor outlet 72 fluidically connected to compressor inlet portion 62, an evaporator inlet 80 fluidically connected to evaporator discharge conduit 60 and an evaporator outlet 82 fluidically connected to evaporator feed conduit 58. As shown in FIGS. 3 and 4, VIR 50 includes a receiver drier (RD) shell 86 and a cap member 88. Cap member 88 supports condenser inlet 70, compressor outlet 72, evaporator inlet 80 and evaporator outlet 82. Cap member 88 is detachably mounted to RD shell 86 through, for example, interaction between pluralities of threads (not separately labeled).

RD shell 86 includes an outer surface 92 and an inner surface 94 defining an interior portion 96. A drier housing 105 is arranged in interior portion 96. Drier housing 105 is spaced from inner surface 94 by an internal heat exchanger (IHX) passage 109. A first conduit 113 extends into the drier housing 105 between its inner surface 95 and an exterior surface of a molded desiccant 130 disposed internal to the drier housing 105. The molded desiccant is configured to form a restrictive fluid flow passage 108 along the interior surface 95 of the drier housing 105. The commercially available desiccant 130 is molded geometrically in unique shapes to provide refrigerant flow direction restriction (in this case internal to the drier housing). As such, the molded desiccant 130 may include an exterior surface complementary to the inner surface of the drier housing (not shown). Additionally, at least one other molded desiccant (not shown) may be disposed external to the drier housing and configured to form at least one other restrictive fluid flow passage along an exterior surface of the drier housing. Further, the at least one other molded desiccant may include an interior surface complementary to the exterior surface of the drier housing. Another exemplary embodiment may include disposing a molded desiccant on the inner surface 94 of the receiver drier shell 86.

First conduit 113 is fluidically connected to condenser inlet 70 and receives a flow of refrigerant from condenser 42. A second conduit 114 also extends into drier housing 105. Second conduit 114 includes a first end 117 that fluidically connects with evaporator outlet 82 and a second end 118. Second end 118 is connected to a pick-up screen 122 that filters refrigerant passing to evaporator 44.

Desiccant 130 reduces moisture that may be present in the refrigerant. Desiccant 130 may be readily accessed and replaced as needed. It is to be understood that the amount (quantity), shape, and/or type of desiccant may vary. It should also be understood that a filter or screen (not shown) may be provided with the desiccant 130. It is also to be understood that exemplary embodiments may also include a non-replaceable desiccant.

At least one other desiccant RD shell 86 also includes an evaporator discharge accumulation portion 132 that receives and may store refrigerant passing from evaporator 44. A compressor discharge conduit 137 extends toward evaporator discharge accumulation portion 132 and delivers refrigerant to compressor outlet 72. Outer surface 92 may define a heat shield for RD shell 86.

In further accordance with an exemplary embodiment, cap member 88, in addition to supporting condenser inlet 70, compressor outlet 72, evaporator inlet 80 and evaporator outlet 82, may also support a number of other components associated with climate control system 40. For example, cap member 88 may support an expansion valve 157, FIG. 3. Expansion valve 157 may take the form of a thermal expansion valve (TXV). It is to be understood that expansion valve 157 may take the form of a mechanically operated expansion valve or an electric/electronic expansion valve. Expansion valve 157 is readily accessible and may be serviceable. Cap member 88 may also support a high side charge port 160 and a low side charge port 162 to facilitate charging and monitoring of refrigerant. Additionally, cap member 88 may support one or more sensor ports 166 and 168 that may be provided with various sensors that provide data pertaining to climate control system 40.

At this point, it should be understood that the exemplary embodiments describe a valve-in-receiver (VIR) that integrates a number of connections and components, including a uniquely moldable desiccant, in order to simplify a climate control system. Additionally, by incorporating charge ports, sensors, and connections into the cap member, the VIR may be readily serviced and the climate control system may be serviced at a single point thereby simplifying repairs and/or diagnostics. Further, combining multiple climate control components into a single device simplifies plumbing, and enhances access to other under hood components.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A valve in receiver (VIR) including a fluid flow directing desiccant for a climate control system comprising:
   a receiver drier shell including an outer surface and an inner surface defining an interior portion having an opening;
   a drier housing disposed in the receiver drier shell; and
   a molded desiccant disposed internal to the drier housing and forming a restrictive fluid flow passage between an inner surface of the drier housing and an exterior surface of the molded desiccant to restrict flow direction through the fluid flow passage.

2. The valve in receiver of claim 1 further comprising a first conduit extending into the drier housing between the interior surface and the molded desiccant.

3. The valve in receiver of claim 1 wherein the molded desiccant further comprises an exterior surface complementary to the inner surface of the drier housing.

4. A climate control system including a fluid flow directing desiccant for a vehicle comprising:
   a condenser including a condenser outlet portion;
   a compressor including a compressor inlet portion and a compressor outlet portion, the compressor outlet portion being fluidically connected to the condenser;
   an evaporator including an evaporator inlet portion and an evaporator output portion; and a valve in receiver (VIR) fluidically connected to the condenser, the compressor and the evaporator, the VIR comprising:
a receiver drier shell including an outer surface and an inner surface defining an interior portion having an opening;
a drier housing disposed in the receiver drier shell; and
a molded desiccant disposed internal to the drier housing and forming a restrictive fluid flow passage between an inner surface of the drier housing and an exterior surface of the molded desiccant to restrict flow direction through the fluid flow passage.

5. The climate control system of claim 4 further comprising a first conduit extending into the drier housing between the interior surface and the molded desiccant.

6. The climate control system of claim 4 wherein the molded desiccant further comprises an exterior surface complementary to the interior surface of the drier housing.

7. A vehicle comprising:
a chassis;
a body supported by the chassis, the body including a motor compartment and an occupant zone; and
climate control system supported by the body, the climate control system comprising:
a condenser including a condenser outlet portion;
a compressor including a compressor inlet portion and a compressor outlet portion, the compressor outlet portion being fluidically connected to the condenser;
an evaporator including an evaporator inlet portion and an evaporator output portion; and
a valve in receiver (VIR) fluidically connected to the condenser, the compressor and the evaporator, the VIR comprising:
a receiver drier shell including an outer surface and an inner surface defining an interior portion having an opening;
a drier housing disposed in the receiver drier shell; and
a molded desiccant disposed internal to the drier housing and forming a restrictive fluid flow passage between an inner surface of the drier housing and an exterior surface of the molded desiccant to restrict flow direction through the fluid flow passage.

8. The vehicle of claim 7 further comprising a first conduit extending into the drier housing between the interior surface and the molded desiccant.

9. The vehicle of claim 7 wherein the molded desiccant further comprises an exterior surface complementary to the interior surface of the drier housing.

* * * * *